(12) United States Patent
Kuang et al.

(10) Patent No.: US 10,798,641 B2
(45) Date of Patent: Oct. 6, 2020

(54) SYSTEM INFORMATION TRANSMISSION METHOD AND APPARATUS

(71) Applicant: Huawei Technologies Co., Ltd., Shenzhen (CN)

(72) Inventors: Yiru Kuang, Beijing (CN); Haibo Xu, Beijing (CN); Nathan Edward Tenny, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/497,245

(22) PCT Filed: Mar. 24, 2017

(86) PCT No.: PCT/CN2017/078158
§ 371 (c)(1),
(2) Date: Sep. 24, 2019

(87) PCT Pub. No.: WO2018/170914
PCT Pub. Date: Sep. 27, 2018

(65) Prior Publication Data
US 2020/0245226 A1    Jul. 30, 2020

(51) Int. Cl.
*H04W 48/08* (2009.01)
(52) U.S. Cl.
CPC .................. *H04W 48/08* (2013.01)
(58) Field of Classification Search
CPC ..... H04W 48/08; H04W 48/16; H04W 48/18; H04W 48/20; H04W 88/06
USPC .............. 455/434, 422.1, 561, 466
See application file for complete search history.

(56) References Cited

U.S. PATENT DOCUMENTS

| | | | |
|---|---|---|---|
| 2014/0248896 A1* | 9/2014 | Kondo | H04W 24/02 455/452.2 |
| 2014/0307611 A1 | 10/2014 | Tesanovic et al. | |
| 2015/0215766 A1* | 7/2015 | Russell | H04W 8/18 455/433 |
| 2015/0319738 A1 | 11/2015 | Fodor et al. | |
| 2016/0007271 A1 | 1/2016 | Plicanic Samuelsson et al. | |

(Continued)

FOREIGN PATENT DOCUMENTS

| | | |
|---|---|---|
| CN | 104105103 A | 10/2014 |
| CN | 105580399 A | 5/2016 |

(Continued)

OTHER PUBLICATIONS

LG Electronics Inc.,"Further discussion on SI message delivery for remote UE", R2-1705556, 3GPP TSG-RAN WG2 Meeting #98,Hangzhou, China, May 15-19, 2017, 3 pages.

(Continued)

*Primary Examiner* — Nghi H Ly
(74) *Attorney, Agent, or Firm* — Conley Rose, P.C.

(57) ABSTRACT

A system information transmission method and apparatus are disclosed. A second terminal device sends identifier information, and a first terminal device obtains the identifier information sent by the second terminal device, where the identifier information includes a first cell identifier, and the first cell identifier is a cell identifier of a camped-on cell or a serving cell that is accessed before a direct link between the second terminal device and the first terminal device is established.

20 Claims, 11 Drawing Sheets

(56) References Cited

U.S. PATENT DOCUMENTS

| | | | |
|---|---|---|---|
| 2016/0037550 A1* | 2/2016 | Barabell | H04B 17/318 |
| | | | 455/450 |
| 2016/0278032 A1* | 9/2016 | Yi | H04L 5/0048 |
| 2018/0199390 A1 | 7/2018 | Hahn et al. | |
| 2019/0090177 A1 | 3/2019 | Yan et al. | |

FOREIGN PATENT DOCUMENTS

| | | |
|---|---|---|
| CN | 106465167 A | 2/2017 |
| CN | 106471861 A | 3/2017 |
| EP | 3101927 A1 | 12/2016 |
| WO | 2017018553 A1 | 2/2017 |

OTHER PUBLICATIONS

Sharp,"FeD2D System Information Relaying", R2-167642, 3GPP TSG-RAN WG2#96, Reno, USA, Nov. 14-18, 2016, 5 pages.
Foreign Communication From A Counterpart Application, European Application No. 17901552.4, Extended European Search Report dated Jan. 2, 2020, 9 pages.
Foreign Communication From A Counterpart Application, PCT Application No. PCT/CN2017/078158, English Translation of International Search Report dated Dec. 27, 2017, 2 pages.
Foreign Communication From A Counterpart Application, PCT Application No. PCT/CN2017/078158, English Translation of Written Opinion dated Dec. 27, 2017, 3 pages.

* cited by examiner

SYSTEM INFORMATION TRANSMISSION METHOD AND APPARATUS

CROSS-REFERENCE TO RELATED APPLICATIONS

This application is a national stage of International Application No. PCT/CN2017/078158, filed on Mar. 24, 2017, which is hereby incorporated by reference in its entirety.

TECHNICAL FIELD

This application relates to the field of communications technologies, and in particular, to a system information transmission method and apparatus.

BACKGROUND

A device-to-device (Device-to-Device, D2D) communication mode is a communication mode in which a transmit end directly sends data to a receive end without forwarding by a base station or a cellular network. A relatively special mode in the D2D communication mode is a UE-to-network relay scenario. In the UE-to-network relay scenario, a terminal device (for example, user equipment (User Equipment, UE)) is connected to a network by using another terminal device having a relay function. Usually, the former is referred to as remote user equipment (Remote UE), and the latter is referred to as relay user equipment (Relay UE).

In the UE-to-network relay scenario, when system information of a cell newly accessed by the remote user equipment or a cell accessed by the remote user equipment changes, the remote user equipment needs to obtain the system information. Remote user equipment in coverage of a cell may receive, through a cellular link between the remote user equipment and a base station of the cell, system information broadcast by the base station. However, in this case, the remote user equipment needs to maintain two links: the cellular link and a sidelink (a link between the remote user equipment and relay user equipment), resulting in relatively high complexity and relatively high power consumption. Remote user equipment out of the coverage of the cell cannot obtain the system information broadcast by the base station of the cell.

Therefore, it is imperative to provide a system information transmission method, so that both the remote user equipment out of the coverage of the cell and the remote user equipment in the coverage of the cell can obtain the system information broadcast by the base station of the cell, to reduce complexity and power consumption.

SUMMARY

Embodiments of this application provide a system information transmission method and apparatus, so that remote user equipment out of coverage of a cell and remote user equipment in the coverage of the cell can obtain system information broadcast by a base station of the cell, to reduce complexity and power consumption.

According to a first aspect, a system information transmission method is provided. In the method, a second terminal device sends identifier information to a first terminal device, and the first terminal device obtains the identifier information sent by the second terminal device, where the identifier information includes a first cell identifier. If the first terminal device determines that the first cell identifier included in the obtained identifier information is inconsistent with a second cell identifier, the first terminal device sends a first message to the second terminal device, and the second terminal device receives the first message sent by the first terminal device, where the first message includes a part or all of system information delivered by a network device of a camped-on cell or a serving cell of the first terminal device.

In the foregoing method, whether the second terminal device is out of coverage of a camped-on cell or a serving cell that is accessed after a direct link between the second terminal device and the first terminal device is established or is in coverage of a camped-on cell or a serving cell that is accessed after a direct link between the second terminal device and the first terminal device is established, the second terminal device can obtain system information delivered by a network device of the camped-on cell or the serving cell that is accessed after the direct link between the second terminal device and the first terminal device is established. In the foregoing method, the second terminal device can obtain the system information delivered by the network device of the camped-on cell or the serving cell that is accessed after the direct link between the second terminal device and the first terminal device is established, without a need to interact with the network device of the camped-on cell or the serving cell that is accessed after the direct link between the second terminal device and the first terminal device is established. Therefore, the second terminal device no longer needs to maintain a communication link between the second terminal device and the network device of the camped-on cell or the serving cell that is accessed after the direct link between the second terminal device and the first terminal device is established, thereby reducing complexity and power consumption.

The first cell identifier in the identifier information is a cell identifier of a camped-on cell or a serving cell that is accessed before a direct link between the second terminal device and the first terminal device is established. The second cell identifier is a cell identifier of a camped-on cell or a serving cell that is accessed after the direct link between the second terminal device and the first terminal device is established or is a cell identifier of the camped-on cell or the serving cell of the first terminal device.

In a possible implementation, the identifier information further includes a first system information value identifier. If the first terminal device determines that the first cell identifier is consistent with the second cell identifier but the first system information value identifier is different from a second system information value identifier, the first terminal device sends the first message to the second terminal device. The first system information value identifier is carried in the identifier information, so that when the first terminal device determines that the camped-on cell or the serving cell that is accessed after the direct link between the second terminal device and the first terminal device is established is the same as the camped-on cell or the serving cell that is accessed before the direct link between the second terminal device and the first terminal device is established, the first terminal device can further determine, based on the first system information value identifier included in the identifier information and the second system information value identifier, whether the first terminal device needs to send the first message to the second terminal device. In this way, if a camped-on cell or a serving cell in which the second terminal device is located does not change but system information in the cell changes, the second terminal device obtains the system information.

The first system information value identifier is a system information value identifier of the camped-on cell or the serving cell that is accessed before the direct link between the second terminal device and the first terminal device is established, and the second system information value identifier is a system information value identifier of the camped-on cell or the serving cell of the first terminal device.

In another possible implementation, system information included in the first message may be a part of system information of the camped-on cell or the serving cell of the first terminal device, this part of system information may include basic system information required by the second terminal device, and the basic system information is system information required by each second terminal device in the camped-on cell or the serving cell.

In still another possible implementation, the first message further includes specific system information required by the second terminal device. The specific system information may be understood as system information in system information required by the second terminal device except the basic system information. The second terminal device may not require the specific system information, and specific system information required by different second terminal devices may be the same or partially the same.

In still another possible implementation, before the first terminal device sends the first message to the second terminal device, the second terminal device may send a second message to the first terminal device, where the second message is used to indicate the specific system information required by the second terminal device. The first terminal device receives the second message sent by the second terminal device, and before the first terminal device sends the first message to the second terminal device, the second terminal device sends, to the first terminal device, the second message that is used to indicate the specific system information required by the second terminal device. The first terminal device may add the specific system information required by the second terminal device to the sent first message, thereby reducing signaling overheads.

In still another possible implementation, after the first terminal device receives the second message sent by the second terminal device, the first terminal device may further store the specific system information required by the second terminal device, so that when the second terminal device subsequently needs to re-obtain the specific system information, the first terminal device directly sends the stored specific system information to the second terminal device.

In still another possible implementation, after the first terminal device obtains the identifier information sent by the second terminal device, if the first terminal device determines that the first cell identifier is consistent with the second cell identifier and that the first system information value identifier is the same as the second system information value identifier, the first terminal device sends, to the second terminal device, indication information that is used to indicate that original system information stored by the second terminal device is valid, and the second terminal device receives the indication information sent by the first terminal device to determine that the system information stored by the second terminal device is valid, and does not need to re-obtain the system information.

The original system information is system information delivered by a network device of the camped-on cell or the serving cell that is accessed before the direct link between the second terminal device and the first terminal device is established.

In still another possible implementation, before the first terminal device obtains the identifier information sent by the second terminal device, the first terminal device and the second terminal device may determine that the direct link between the first terminal device and the second terminal device is established. System information is transmitted between the first terminal device and the second terminal device after the direct link between the first terminal device and the second terminal device is established, and signaling and a protocol do not change in a process of establishing the direct link. Therefore, the system information transmission method not only may be applied to a 3GPP access technology of the first terminal device and the second terminal device, namely, a scenario in which a short-range communication link is a sidelink, but also may be applied to a non-3GPP access technology of the first terminal device and the second terminal device, namely, a scenario in which a short-range communication link uses a Bluetooth technology or a Wi-Fi technology.

In still another possible implementation, the identifier information may be carried in a direct link request message sent by the second terminal device to the first terminal device, and signaling overheads can be reduced by carrying the identifier information in the direct link request message sent by the second terminal device.

In still another possible implementation, if the second terminal device requires a special service, and the second terminal device needs to send the second message and the identifier information to the first terminal device, the second terminal device may add both the identifier information and the second message to a direct link request message sent by the second terminal device to the first terminal device, thereby reducing signaling overheads.

In still another possible implementation, if the first terminal device sends, to the second terminal device, indication information that is used to indicate that original system information stored by the first terminal is valid, the indication information may be carried in a direct link accept message sent by the first terminal device to the second terminal device, thereby reducing signaling overheads.

In still another possible implementation, the first terminal device may add, to a direct link accept message sent by the first terminal device to the second terminal device, the first message that includes the system information and that is sent to the second terminal device, thereby reducing signaling overheads.

According to a second aspect, a system information transmission method is provided. In the method, a first terminal device may send identifier information to a second terminal device, where the identifier information includes a second cell identifier, and may further include a second system information value identifier. The second terminal device determines, based on the received second cell identifier and the received second system information value identifier, whether system information needs to be requested from the second terminal device. If a first cell identifier is inconsistent with the second cell identifier, or if a first cell identifier is consistent with the second cell identifier but a first system information value identifier is different from the second system information value identifier, the second terminal device sends a request message to the first terminal device, where the request message requests the first terminal device to send the system information to the second terminal device. If the first terminal device receives the request message sent by the second terminal device, the first terminal device sends a first message to the second terminal device. If the first terminal device receives a second message sent by the second terminal device, the first terminal device may further store specific system information of each second terminal device.

The identifier information may be sent after a direct link between the first terminal device and the second terminal device is established, or may be included in a direct link accept message sent by the first terminal device to the second terminal device.

The second terminal device may send the request message and the second message by using one piece of information, or may separately send the request message and the second message.

According to a third aspect, a system information transmission apparatus is provided. The system information transmission apparatus can implement a function of the first terminal device in the method in the first aspect. The function may be implemented by hardware, or may be implemented by hardware executing corresponding software. The hardware or the software includes one or more modules corresponding to the foregoing function. The module may be software and/or hardware.

In a possible design, the system information transmission apparatus includes a receiving unit, a processing unit, and a sending unit, and functions of the receiving unit, the processing unit, and the sending unit may be corresponding to the method steps. Details are not described herein again.

According to a fourth aspect, a system information transmission apparatus is provided. The system information transmission apparatus can implement a function of the second terminal device in the method in the first aspect. The function may be implemented by hardware, or may be implemented by hardware executing corresponding software. The hardware or the software includes one or more modules corresponding to the foregoing function. The module may be software and/or hardware.

In a possible design, the system information transmission apparatus includes a sending unit and a receiving unit, and functions of the sending unit and the receiving unit may be corresponding to the method steps. Details are not described herein again.

According to a fifth aspect, a first terminal device is provided, and the first terminal device includes a receiver, a transmitter, a processor, and a memory. The receiver, the transmitter, the processor, and the memory may be connected to each other through a bus system. The memory is configured to store a program, and the processor is configured to execute the program in the memory, to perform the method performed by the first terminal device in the first aspect or any possible implementation of the first aspect.

According to a sixth aspect, a second terminal device is provided, and the second terminal device includes a receiver, a transmitter, a processor, and a memory. The receiver, the transmitter, the processor, and the memory may be connected to each other through a bus system. The memory is configured to store a program, and the processor is configured to execute the program in the memory, to perform the method performed by the second terminal device in the first aspect or any possible implementation of the first aspect.

According to a seventh aspect, an embodiment of this application provides a communications system, and the communications system includes the first terminal device in the fifth aspect and the second terminal device in the sixth aspect.

According to an eighth aspect, an embodiment of this application provides a computer readable storage medium or a computer program product, configured to store a computer program. The computer program is used to perform the method in the first aspect and any possible implementation of the first aspect.

According to the system information transmission method provided in the embodiments of this application, the first terminal device sends the system information to the second terminal device when determining that the first terminal device needs to send the system information to the second terminal device, so that the second terminal device can obtain control signaling and user data by using the first terminal device, in other words, can obtain the system information. Therefore, the second terminal device may maintain only a sidelink between the second terminal device and the first terminal device without a need to maintain a cellular link, thereby reducing complexity and power consumption of system information transmission, and enabling both a second terminal device out of coverage of a cell and a second terminal device in the coverage of the cell to obtain system information broadcast by a base station of the cell. Further, the first terminal device sends the system information to the second terminal device when determining that the first terminal device needs to send the system information to the second terminal device, so that power consumption and signaling overheads can be reduced in comparison with a case in which the first terminal device periodically sends all system information received from the base station to the second terminal device.

DESCRIPTION OF EMBODIMENTS

The following describes the embodiments of this application with reference to accompanying drawings.

A system information transmission method provided in the embodiments of this application may be applied to a communication scenario in which two devices directly communicate with each other. In the embodiments of this application, devices that directly communicate with each other may include various handheld devices, in-vehicle devices, wearable devices, or computing devices with a wireless communication function, or other processing devices connected to a wireless modem, and user equipment (User Equipment, UE) in various forms, mobile stations (Mobile station, MS) in various forms, terminals (Terminal) in various forms, terminal devices (Terminal Equipment) in various forms, and the like. For ease of description, the devices that directly communicate with each other are referred to as terminal devices below in the embodiments of this application.

Figure 1:
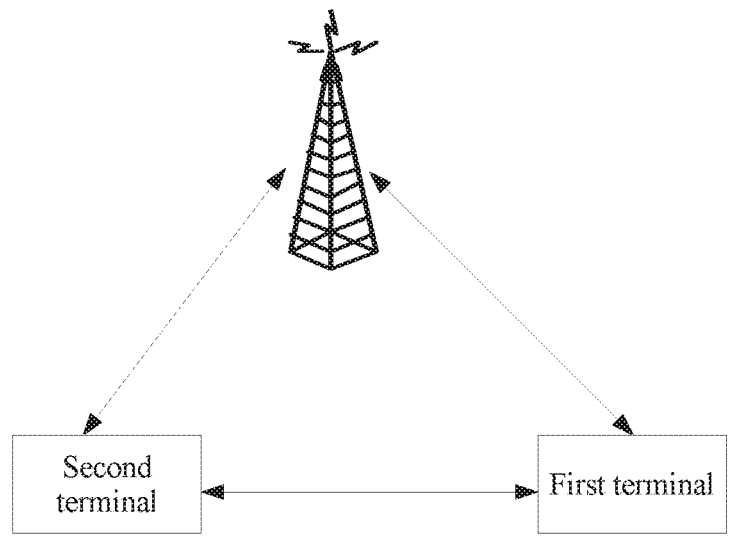
FIG. 1 is an architectural diagram of an application scenario of a system information transmission method according to an embodiment of this application.

A UE-to-network relay scenario is a typical application scenario in which two devices directly communicate with each other. FIG. 1 is a schematic architectural diagram of the UE-to-network relay scenario. In the application scenario shown in FIG. 1, a link between a network device and a first terminal device and a link between the network device and a second terminal device may be referred to as cellular links or may be referred to as an uplink and a downlink, and a link between the first terminal device and the second terminal device may be referred to as a sidelink. In this application, the first terminal device is a terminal device that directly interacts with the network device and may also be referred to as relay user equipment, and the second terminal device is a terminal device that communicates with the network device by using the first terminal device and may also be referred to as remote user equipment. In existing layer 3 UE-to-network relay communication, control signaling of the second terminal device may interact with the network device through a cellular link, and user data of the second terminal device may interact with the network device by using a sidelink. That is, user data between the second terminal device and the network device may be forwarded to the second terminal device by using the first terminal device, or user data between the second terminal device and the network device may be forwarded to the network device by using the first terminal device. In layer 2 UE-to-network relay communication, both control signaling and user data of the second terminal device may interact with the network device by using a sidelink.

It may be understood that the network device in FIG. 1 is an apparatus that is deployed in a radio access network and provides a wireless communication function for a terminal, and may be a base station (base station, BS), for example, may include various forms such as a macro base station, a micro base station, a relay station, and an access point. In a system using different radio access technologies, a name of a device with a base station function may vary. For example, the device is referred to as an evolved NodeB (evolved NodeB, eNB or eNodeB for short) in a long term evolution (Long Term Evolution, LTE) network, or is referred to as a NodeB (NodeB) in a third generation 3G network. For ease of description, in the embodiments of this application, the network device that communicates with the first terminal device and the second terminal device is referred to as a base station below.

In the application scenario shown in FIG. 1, in different coverage scenarios, the second terminal device may be in coverage (In Coverage, IC) of a cell or may be out of coverage (Out of Coverage, OOC) of a cell, but the first terminal device is certainly in the coverage of the cell. The first terminal device and the second terminal device in the coverage of the cell may communicate with a base station through a cellular link. The second terminal device out of the coverage of the cell cannot directly communicate with a base station through a cellular link. However, because the first terminal device may provide coverage for the second terminal device, the second terminal device out of the coverage of the cell may communicate with the base station by using the first terminal device, and send uplink data to the base station by using the first terminal device or receive, by using the first terminal device, downlink data sent by the base station.

In this embodiment of this application, to enable both the second terminal device out of the coverage of the cell and the second terminal device in the coverage of the cell to obtain system information broadcast by a base station of the cell, a second terminal device may establish a direct link with the first terminal device in the coverage of the cell, and the system information broadcast by the base station is sent to the second terminal device by using the first terminal device. The system information is a message that is periodically broadcast by the base station to all terminal devices in the cell on a broadcast channel. The system information is classified into a master information block (Master Information Block, MIB) and a plurality of system information blocks (System Information Blocks, SIB). The master information block includes a limited quantity of most important and commonly used transmission parameters for reading other cell information. The system information block includes other required parameters, including 20 system information blocks: a SIB1 to a SIB20.

In this embodiment of this application, the second terminal device that establishes the direct link with the first terminal device in the coverage of the cell may be in coverage of a camped-on cell or a serving cell of the first terminal device, or may be out of coverage of a camped-on cell or a serving cell of the first terminal device. This is not limited in this embodiment of this application. In this application, when the second terminal device is connected to a first terminal device, it is considered that the second terminal device accesses the serving cell or the camped-on cell of the first terminal device. The serving cell is a cell to which a terminal device is connected when the terminal device is in a radio resource control (Radio Resource Control, RRC) connected mode. The camped-on cell is a cell on which a terminal device camps when the terminal device is in an RRC idle mode.

Figure 2:
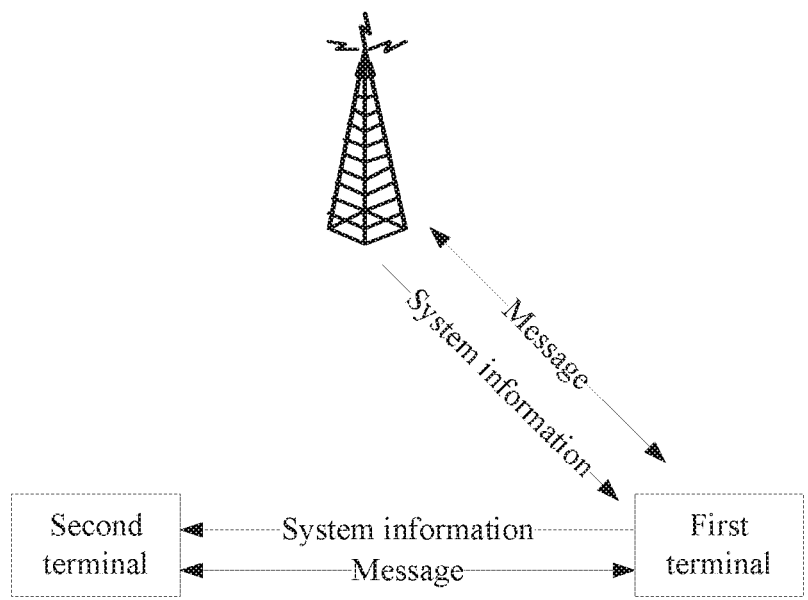
FIG. 2 is an implementation flowchart of a system information transmission method according to an embodiment of this application.

FIG. 2 is a schematic diagram in which a second terminal device receives system information by using a first terminal device that establishes a direct link with the second terminal device according to an embodiment of this application. It can be learned from FIG. 2 that, the second terminal device may obtain control signaling and user data by using the first terminal device, in other words, may obtain the system information. Therefore, the second terminal device may maintain only a sidelink between the second terminal device and the first terminal device without a need to maintain a cellular link, thereby reducing complexity and power consumption of system information transmission, and enabling both a second terminal device out of coverage of a cell and a second terminal device in the coverage of the cell to obtain system information broadcast by a base station of the cell.

It may be understood that the system information transmission method provided in the embodiments of this application is not limited to the application scenario shown in FIG. 1, and may also be applied to an application scenario in which two other devices directly communicate with each other, for example, a short-range communication scenario in which a Bluetooth technology or a wireless fidelity (Wireless Fidelity, WiFi) technology is used.

The following describes an implementation method in which the system information is sent to the second terminal device by using the first terminal device with reference to actual application in the embodiments of this application.

Figure 3:
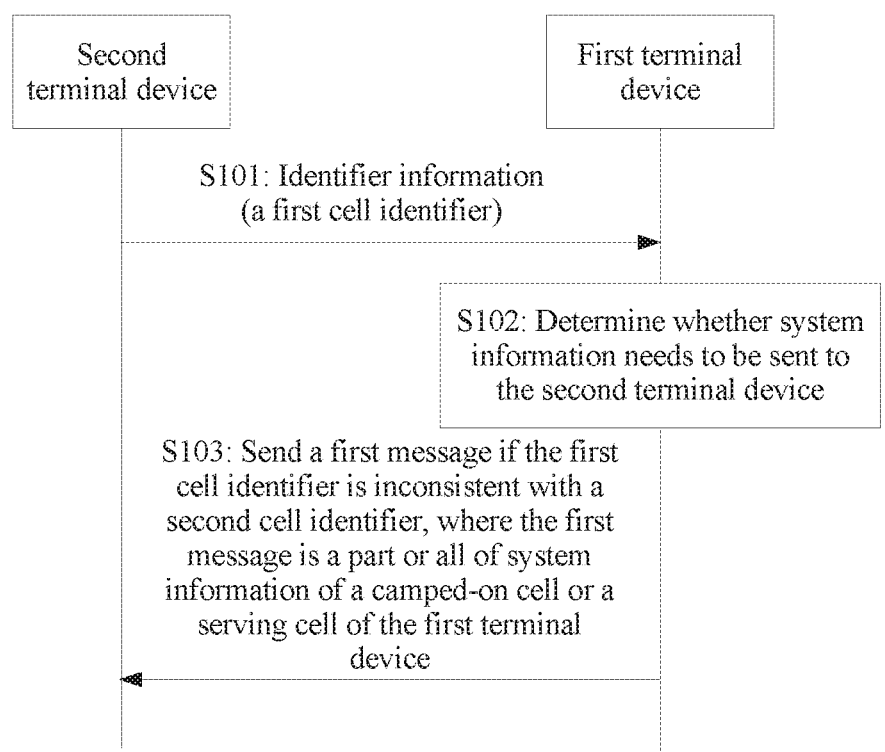
FIG. 3 is another implementation flowchart of a system information transmission method according to an embodiment of this application.

FIG. 3 is a first implementation flowchart of a system information transmission method according to an embodiment of this application. Referring to FIG. 3, the method includes the following steps.

S101: A second terminal device sends identifier information to a first terminal device, and the first terminal device receives the identifier information sent by the second terminal device.

In this embodiment of this application, the identifier information sent by the second terminal device to the first terminal device is mainly used to enable the first terminal device to determine whether the first terminal device needs to send system information to the second terminal device, and the first terminal device sends the system information to the second terminal device when determining that the first terminal device needs to send the system information to the second terminal device, thereby reducing signaling overheads.

In a possible implementation, the identifier information sent by the second terminal device to the first terminal device includes a first cell identifier, and the first cell identifier is a cell identifier of a camped-on cell or a serving cell that is accessed before a direct link between the second terminal device and the first terminal device is established.

The cell identifier may be a cell identity (IDentity, ID) such as content in an information element (Information Element, IE) cell identity (Cellidentity) in a system information block (System Information Block, SIB) 1 or an evolved cell global identifier (Evolved Cell Global Identifier, ECGI). An out-of-coverage case may be represented by a special cell identifier such as an identifier value of all 0.

S102: The first terminal device determines whether the first terminal device needs to send system information to the second terminal device.

In this embodiment of this application, the first terminal device may determine, by determining whether the first cell identifier is consistent with a second cell identifier, whether the first terminal device needs to send the system information to the second terminal device. The second cell identifier is a cell identifier of a camped-on cell or a serving cell that is accessed after the direct link between the second terminal device and the first terminal device is established or is a cell identifier of a camped-on cell or a serving cell of the first terminal device.

In this embodiment of this application, if the first terminal device determines that the first cell identifier is inconsistent with the second cell identifier, it indicates that a camped-on cell or a serving cell of the second terminal device changes, and the second terminal device needs to re-obtain the system information. The case in which the camped-on cell or the serving cell of the second terminal device changes may be but is not limited to the following cases: path switching between base stations occurs when the second terminal device establishes a connection to the first terminal device, first terminal device reselection between base stations occurs when the second terminal device establishes a connection to the first terminal device, or a second terminal device out of coverage of a cell initially establishes a connection to the first terminal device.

S103: If the first terminal device determines that the first cell identifier is inconsistent with a second cell identifier, the first terminal device sends a first message to the second terminal device, where the first message is a part or all of system information of a camped-on cell or a serving cell of the first terminal device.

In this embodiment of this application, if the first terminal device determines that the first cell identifier is inconsistent with the second cell identifier, the first terminal device sends the first message to the second terminal device, so that the first terminal device can send the first message to the second terminal device if the second terminal device needs to re-obtain the system information, to avoid a case in which the first terminal device sends the first message to the second terminal device if the second terminal device does not need to obtain the system information, thereby reducing signaling overheads and power consumption of the first terminal device.

In a scenario in which the camped-on cell or the serving cell of the second terminal device changes and the second terminal device needs to obtain the system information, a procedure of the system information transmission method shown in FIG. 3 may be performed.

If the camped-on cell or the serving cell in which the second terminal device is located does not change but system information in the cell changes, the second terminal also needs to obtain the system information. In this scenario, a procedure of a system information transmission method shown in FIG. 4 may be performed.

Figure 4:
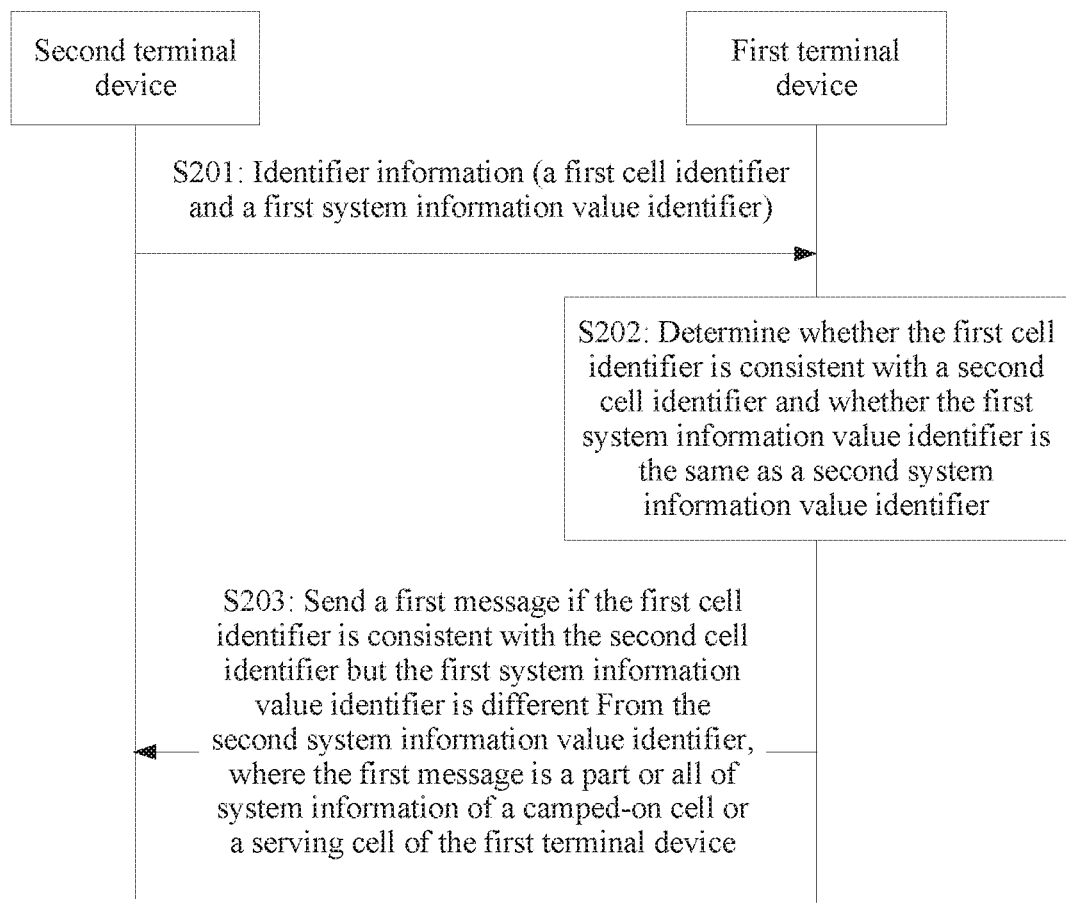
FIG. 4 is still another implementation flowchart of a system information transmission method according to an embodiment of this application.

FIG. 4 is a second implementation flowchart of a system information transmission method according to an embodiment of this application. Referring to FIG. 4, the method includes the following steps.

S201: Identifier information sent by a second terminal device to a first terminal device includes a first system information value identifier in addition to a first cell identifier, and the first system information value identifier is a system information value identifier of a camped-on cell or a serving cell that is accessed before a direct link between the second terminal device and the first terminal device is established.

The system information value identifier may be understood as IE systemInfoSIValueTag in a SIB1.

S202: In addition to determining whether the first cell identifier is consistent with a second cell identifier, the first terminal device may determine whether the first system information value identifier is the same as a second system information value identifier, where the second system information value identifier is a system information value identifier of a camped-on cell or a serving cell of the first terminal device.

The first terminal device may determine, by determining whether the first cell identifier is consistent with the second cell identifier, whether a camped-on cell or a serving cell of the second terminal device changes. If the first cell identifier is consistent with the second cell identifier, it indicates that the camped-on cell or the serving cell of the second terminal device does not change, and the first terminal device may further determine whether system information of the camped-on cell or the serving cell of the second terminal device is updated. The first terminal device may determine, by determining whether the first system information value identifier is the same as the second system information value identifier, whether the system information of the camped-on cell or the serving cell of the second terminal device is updated, to determine whether the first terminal device needs to send the system information to the second terminal device. If the first system information value identifier is different from the second system information value identifier, it indicates that the system information of the camped-on cell or the serving cell of the second terminal device is updated, the second terminal device needs to obtain the system information, and the first terminal device sends the system information to the second terminal device.

S203: The first terminal device sends a first message to the second terminal device, where the first message is a part or all of system information of the camped-on cell or the serving cell of the first terminal device.

In the system information transmission method shown in FIG. 4 in this embodiment of this application, if the first terminal device determines that the first cell identifier is consistent with the second cell identifier but the first system information value identifier is different from the second system information value identifier, the first terminal device sends the first message to the second terminal device. In this way, the first terminal device can send the first message to the second terminal device if the second terminal device needs to obtain the updated system information, to avoid a case in which the first terminal device sends the first message to the second terminal device if the second terminal device does not need to obtain the system information, thereby reducing signaling overheads and power consumption of the first terminal device.

In this embodiment of this application, the first terminal device may send all of system information of the camped-on cell or the serving cell of the first terminal device to the second terminal device. However, a part of system information of the camped-on cell or the serving cell of the first terminal device is not system information required by the second terminal device at a current moment. Therefore, if all of system information of the camped-on cell or the serving cell of the first terminal device is sent to the second terminal device, signaling between the first terminal device and the second terminal device is relatively large, and signaling overheads are relatively high. Therefore, in this embodiment of this application, the first message may be a part of system information of the camped-on cell or the serving cell of the first terminal device. This part of system information may include basic system information required by the second terminal device. The basic system information is system information required by each second terminal device in the camped-on cell or the serving cell, such as cell access related information IE cellAccessRelatedInfo in the SIB1, and a part of system information that needs to be modified by relay user equipment and then provided for remote user equipment for use (even in a same cell, parameter values of system information used by different relay user equipment may be different), such as IE ac-BarringInfo in a SIB2, or a SIB14.

The basic system information may also be understood as system information required by the second terminal device to access a cell for communication by using the first terminal device. By default, each second terminal device that establishes a direct link with the first terminal device needs to obtain basic system information. Therefore, if the second terminal device needs to obtain the system information, the second terminal device certainly needs to obtain the basic system information. If the first terminal device determines that the first terminal device needs to send the system information to the second terminal device, the first terminal device may send the first message that includes the basic system information to the second terminal device. If the second terminal device does not need to support a special service, the second terminal device needs to obtain only the basic system information.

Because second terminal devices may support different capabilities and have different service requirements, types of required system information may also be different. For example, system information required by a second terminal device that supports extended access control (Extended access class barring, EAB) is a SIB14; system information required by a second terminal device that supports a multimedia broadcast multicast service (Multimedia Broadcast Multicast Service, MBMS) is a SIB13, a SIB15, and the like; and system information required by a second terminal device that supports collaboration between a universal mobile telecommunications system (Universal Mobile Telecommunication System, UMTS) evolved universal terrestrial radio access network (Evolved Universal Terrestrial Radio Access Network, E-UTRAN) and a wireless local area network (Wireless Local Area Networks, WLAN) is a SIB17 and the like.

If the second terminal needs to support a special service, that is, if the second terminal device needs to obtain specific system information, the second terminal device may send a second message to the first terminal device, where the second message is used to indicate the specific system information required by the second terminal device. The specific system information may be understood as system information in system information required by the second terminal device except the basic system information. The second terminal device may not require the specific system information, and specific system information required by different second terminal devices may be the same or partially the same.

In this embodiment of this application, an implementation in which the second terminal device sends the second message to the first terminal device to request the specific system information required by the second terminal device may be implemented based on the implementation method shown in FIG. 3 or FIG. 4. For ease of description, the following uses the implementation method shown in FIG. 4 as an example for description.

Figure 5:
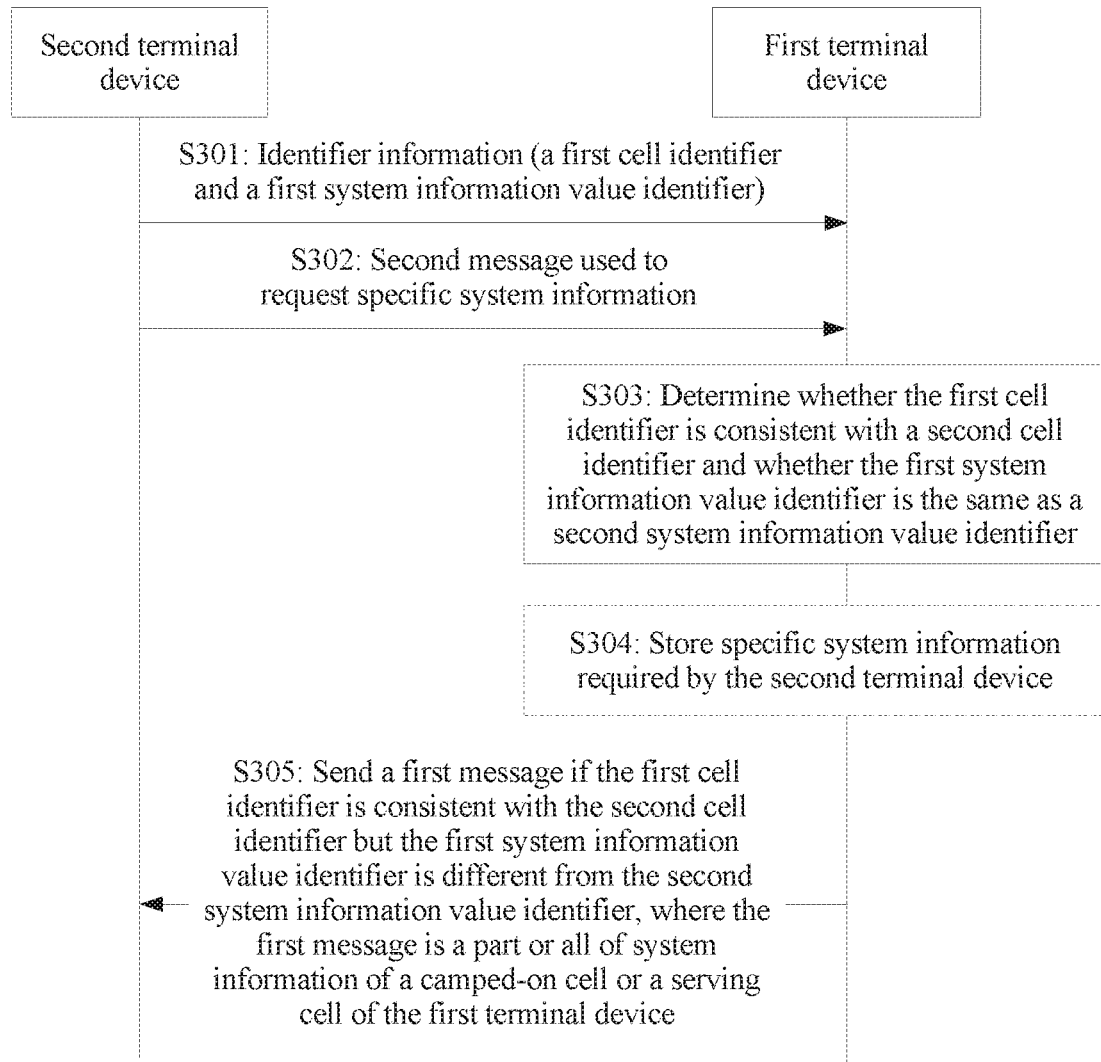
FIG. 5 is still another implementation flowchart of a system information transmission method according to an embodiment of this application.

FIG. 5 is a third implementation flowchart of a system information transmission method according to an embodiment of this application. S301 and S303 in FIG. 5 are the same as S201 and S202 in FIG. 4. Differences are as follows:

S302: The second terminal device sends a second message to the first terminal device, and the first terminal device receives the second message sent by the second terminal device, where the second message is used to indicate specific system information required by the second terminal device.

S304: After receiving the second message sent by the second terminal device, the first terminal device stores the specific system information required by the second terminal device.

The first terminal device stores the specific system information required by the second terminal device, so that when the second terminal device subsequently needs to re-obtain the specific system information, the first terminal device directly sends the stored specific system information to the second terminal device.

S304 is an optional step. If the first terminal device does not store the specific system information required by the second terminal device, the first terminal device may re-obtain the specific system information and send the specific system information to the second terminal device.

S305: If the first terminal device determines that the first cell identifier is consistent with the second cell identifier but the first system information value identifier is different from the second system information value identifier, the first terminal device sends a first message to the second terminal device, where the first message includes basic system information required by the second terminal device and the specific system information required by the second terminal device.

In this embodiment of this application, the second terminal device sends the second message to the first terminal device to request the first terminal device to send the specific system information required by the second terminal device to the second terminal device. The first terminal device may send the basic system information and the specific system information required by the second terminal device to the second terminal device, without a need to send other system information that is not required by the second terminal device, thereby reducing signaling overheads between the first terminal device and the second terminal device.

In another embodiment of this application, if system information stored by the second terminal device is valid, the second terminal device does not need to re-obtain the system information. The first terminal device may send indication information to the second terminal device when determining that the second terminal device does not need to obtain the system information, where the indication information is used to indicate that the system information stored by the second terminal device is valid, to avoid a case in which the second terminal device obtains duplicate system information and reduce signaling overheads.

Figure 6:
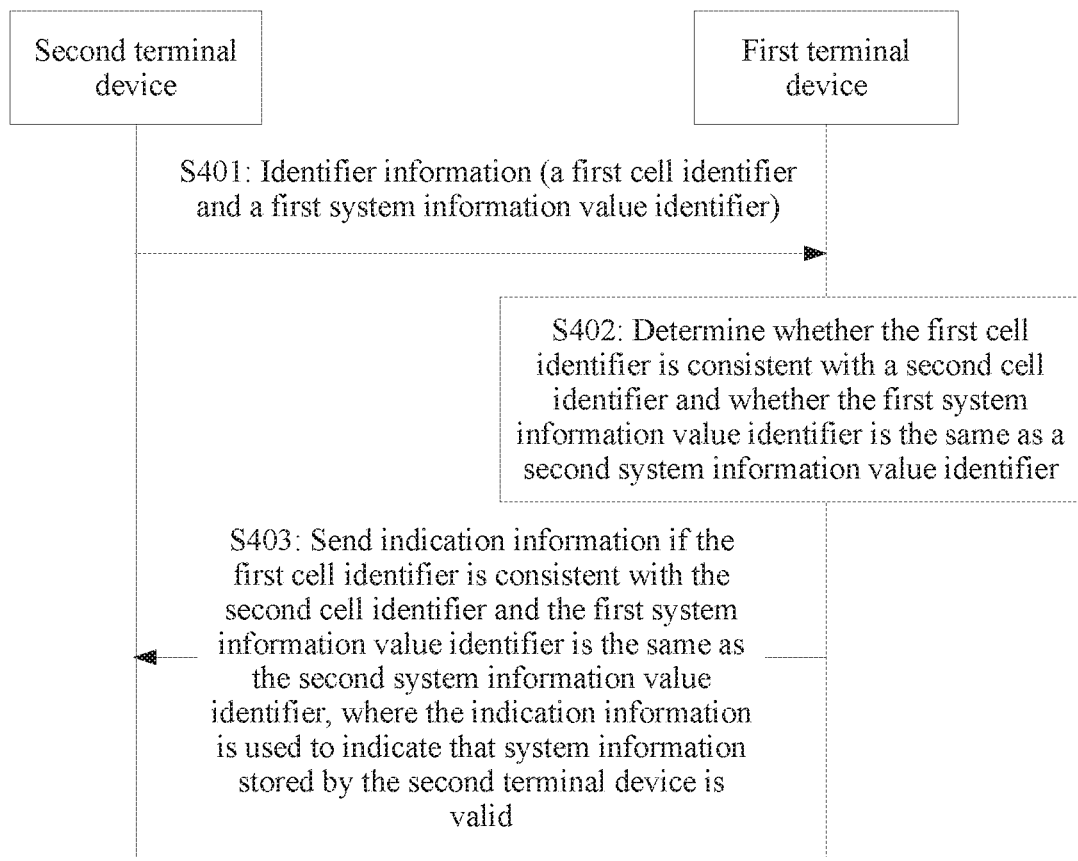
FIG. 6 is still another implementation flowchart of a system information transmission method according to an embodiment of this application.

In this embodiment of this application, a procedure of an implementation method in which the first terminal device sends, to the second terminal device, the indication information indicating that the system information stored by the second terminal device is valid may be shown in FIG. 6. The procedure includes the following steps.

S401: A second terminal device sends identifier information to a first terminal device, where the identifier information includes a first cell identifier and a first system information value identifier.

S402: The first terminal device receives the identifier information sent by the second terminal device, and determines whether the first cell identifier is consistent with a second cell identifier and whether the first system information value identifier is the same as a second system information value identifier.

S403: If the first terminal device determines that the first cell identifier is consistent with the second cell identifier and that the first system information value identifier is the same as the second system information value identifier, the first terminal device sends indication information to the second terminal device, where the indication information is used to indicate that original system information stored by the second terminal device is valid.

The original system information is system information delivered by a network device of a camped-on cell or a serving cell that is accessed before a direct link between the second terminal device and the first terminal device is established.

Figure 7:
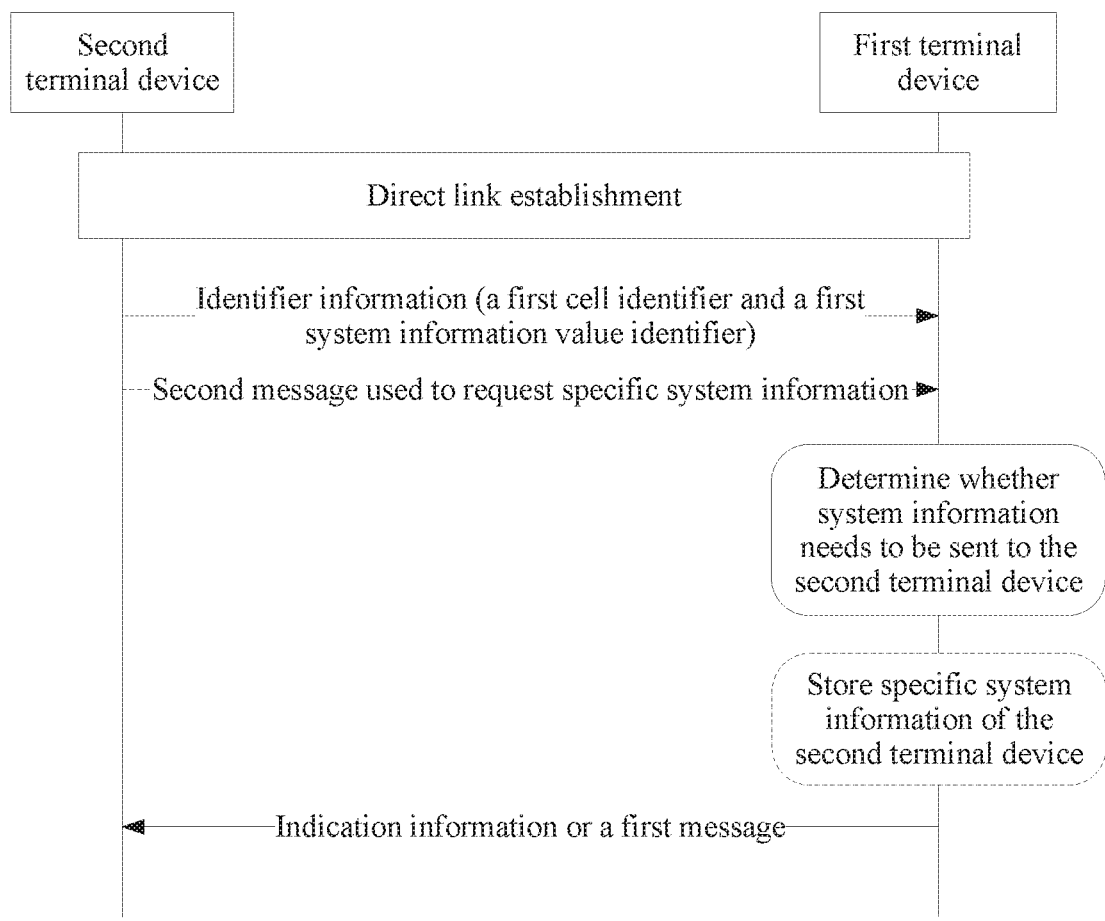
FIG. 7 is still another implementation flowchart of a system information transmission method according to an embodiment of this application.

In still another embodiment of this application, the foregoing system information transmission methods for sending system information to a second terminal device by using a first terminal device may be performed after a direct link between the first terminal device and the second terminal device is established, as shown in FIG. 7. In FIG. 7, if the first terminal device and the second terminal device determine that the direct link between the first terminal device and the second terminal device is established, the second terminal device sends identifier information to the first terminal device, where the identifier information includes a first cell identifier and may further include a first system information value identifier. If the second terminal device requires a special service, the second terminal device may further send a second message to the second terminal device to request required specific system information. The second terminal device may send the identifier information and the second message by using one piece of information, or may separately send the identifier information and the second message. This is not limited in this embodiment of this application. The first terminal device determines, based on the first cell identifier and the first system information value identifier, whether the first terminal device needs to send system information to the second terminal device. If the second terminal device sends the second message to the first terminal device, the first terminal device may further store specific system information of each second terminal device. If the first cell identifier is inconsistent with a second cell identifier, or if the first cell identifier is consistent with a second cell identifier but the first system information value identifier is different from a second system information value identifier, the first terminal device sends a first message to the second terminal device. The first message may include basic system information required by the second terminal device. If the second terminal device sends the second message, the first message further includes the specific system information required by the second terminal device. If the first cell identifier is consistent with the second cell identifier and the first system information value identifier is the same as the second system information value identifier, the first terminal device sends indication information to the second terminal device, to indicate that system information originally stored by the second terminal device is valid.

According to the system information transmission method shown in FIG. 7 in this application, the second terminal device receives the system information by using the first terminal device, so that the second terminal device can maintain only a sidelink between the second terminal device and the first terminal device without a need to maintain a cellular link, thereby reducing complexity and power consumption of system information transmission, and enabling both a second terminal device out of coverage of a cell and a second terminal device in the coverage of the cell to obtain system information broadcast by a base station of the cell. In the system information transmission method shown in FIG. 7 in this application, system information is transmitted between the first terminal device and the second terminal device after the direct link between the first terminal device and the second terminal device is established, and signaling and a protocol do not change in a process of establishing the direct link. Therefore, the system information transmission method not only may be applied to a 3GPP (Third Generation Partnership Project, 3GPP) access technology of the first terminal device and the second terminal device, namely, a scenario in which a short-range communication link is a sidelink, but also may be applied to a non-3GPP access technology of the first terminal device and the second terminal device, namely, a scenario in which a short-range communication link uses a Bluetooth technology or a Wi-Fi technology. Direct link establishment may be initiated by the second terminal device or initiated by the first terminal device, and this is not limited in this embodiment of this application.

In still another embodiment of this application, a second terminal device may add identifier information to a direct link request message sent to a first terminal device, to further reduce signaling overheads between the first terminal device and the second terminal device. In this embodiment of this application, an implementation process in which the identifier information is carried in the direct link request message sent by the second terminal device to the first terminal device is similar to the procedure of the system information transmission method shown in FIG. 7, except that the identifier information is carried in the direct link request message sent to the first terminal device, without a need to separately set new signaling to send the identifier information. For other implementation steps, refer to descriptions of the procedure of the system information transmission method shown in FIG. 7. Details are not described herein again.

Figure 8:
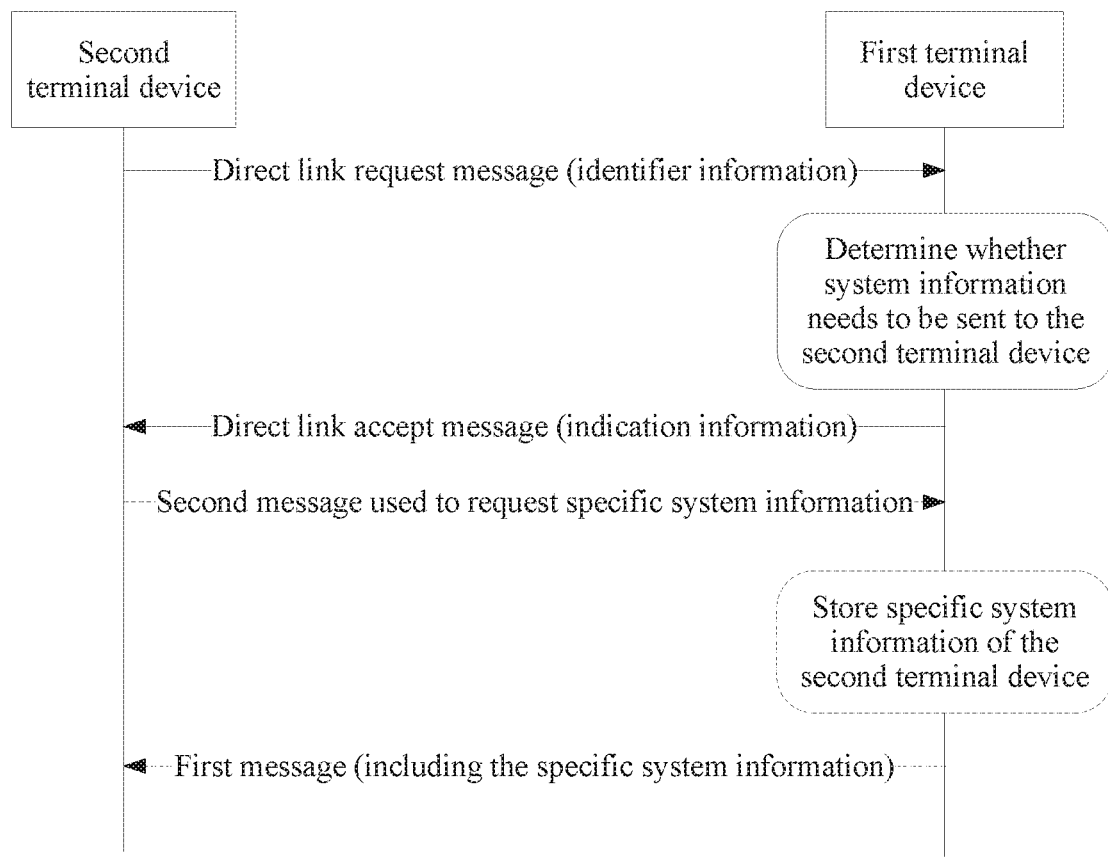
FIG. 8 is still another implementation flowchart of a system information transmission method according to an embodiment of this application.

In still another embodiment of this application, a second terminal device adds identifier information to a direct link request message sent to a first terminal device. After the first terminal device receives the identifier information added by the second terminal device to the direct link request message, if the first terminal device determines that a first cell identifier is consistent with a second cell identifier and that a first system information value identifier is the same as a second system information value identifier, the first terminal device needs to send indication information to the second terminal device, to indicate that basic system information originally stored by the second terminal device is valid. The indication information may be carried in a direct link accept message sent by the second terminal device to the first terminal device, to further reduce signaling overheads between the first terminal device and the second terminal device. If the second terminal device requires a special service, the second terminal device sends a second message to the first terminal device to request specific system information required by the second terminal device. The first terminal device receives the second message, stores the specific system information required by the second terminal device, and sends a first message that includes the specific system information to the second terminal device, as shown in FIG. 8.

Figure 9:
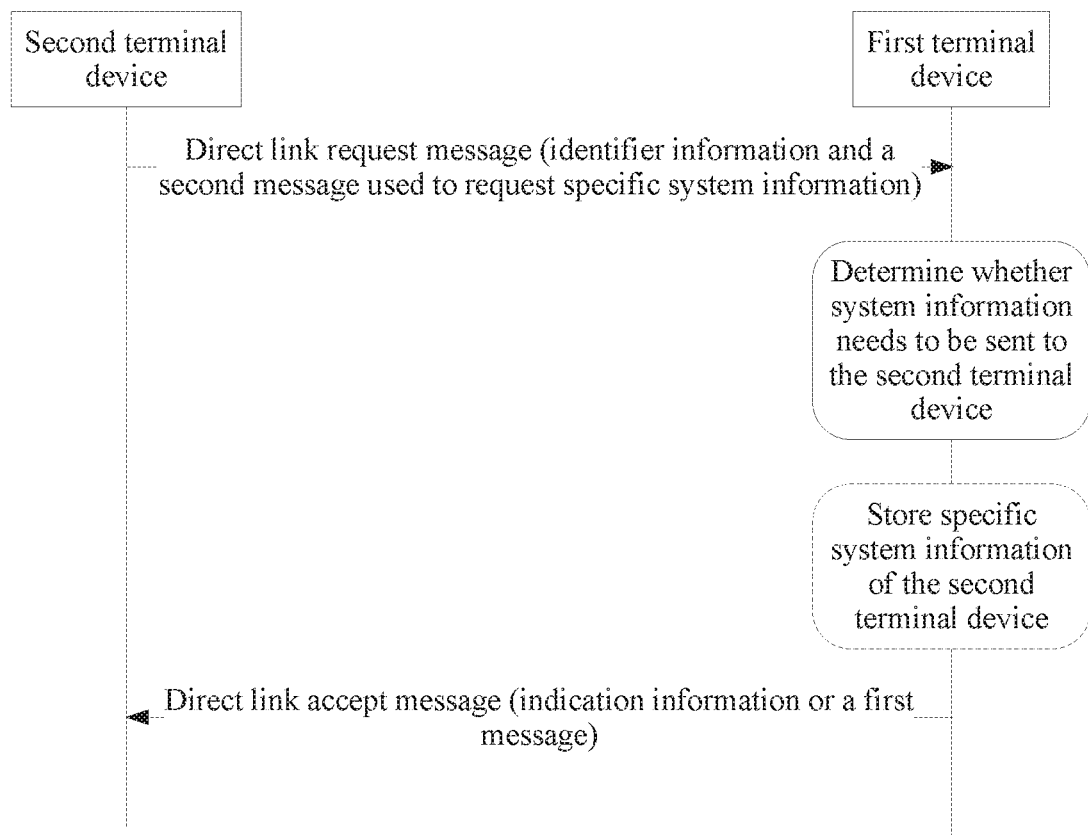
FIG. 9 is still another implementation flowchart of a system information transmission method according to an embodiment of this application.

In still another embodiment of this application, if a second terminal device requires a special service, and the second terminal device needs to send a second message and identifier information to a first terminal device, the second terminal device may add both the identifier information and the second message to a direct link request message sent by the second terminal device to the first terminal device, and the first terminal device adds, to a direct link accept message, a first message or indication information sent to the second terminal device. The first message includes basic system information required by the second terminal device and specific system information required by the second terminal device, to further reduce signaling overheads between the first terminal device and the second terminal device. In this embodiment of this application, an implementation process in which the identifier information and the second message are carried in the direct link request message sent by the second terminal device to the first terminal device, and the first message or the indication information is included in the direct link accept message sent by the first terminal device to the second terminal device is shown in FIG. 9.

Figure 10:
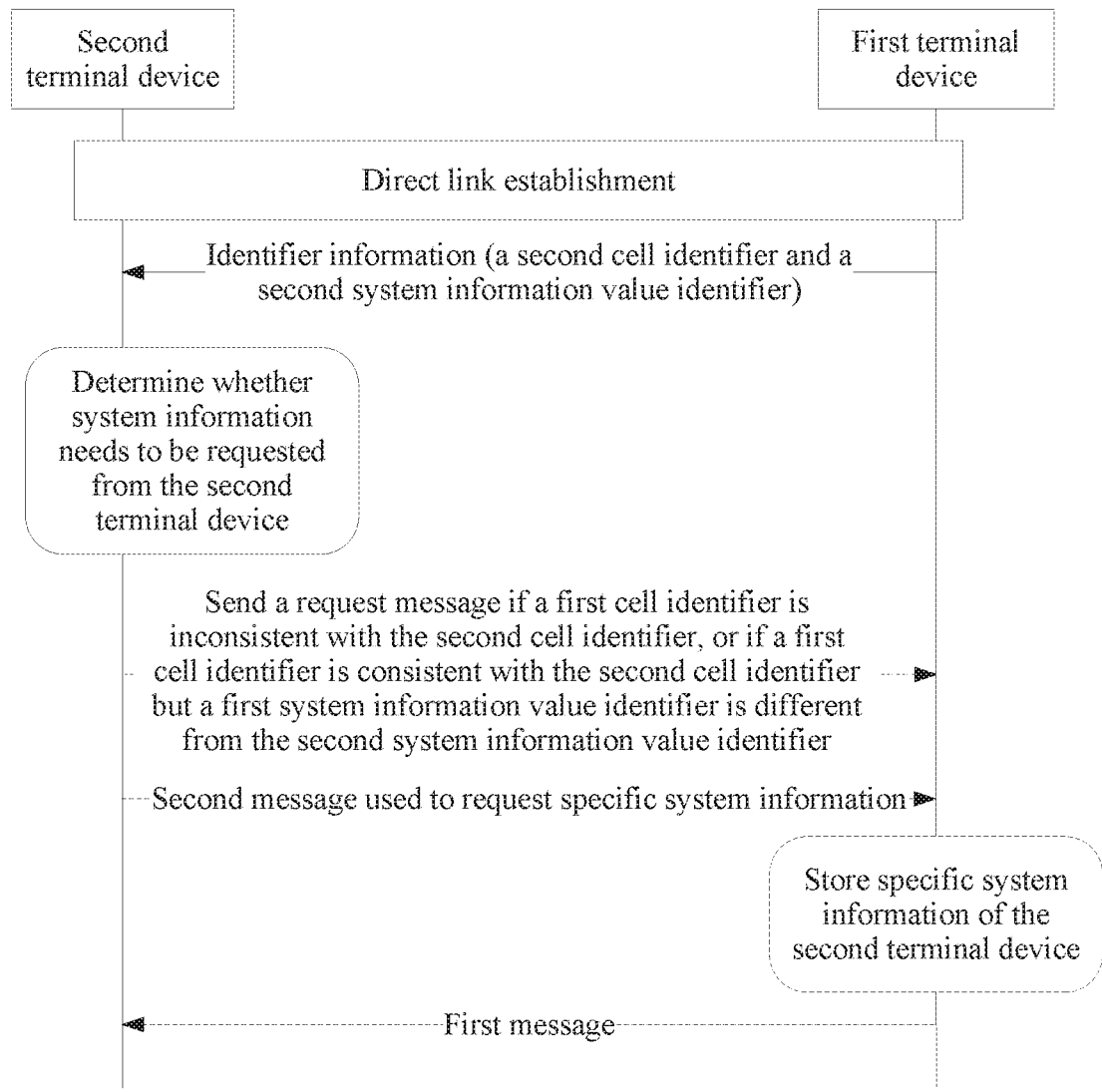
FIG. 10 is still another implementation flowchart of a system information transmission method according to an embodiment of this application.

In still another embodiment of this application, a first terminal device sends identifier information to a second terminal device, where the identifier information includes a second cell identifier, and may further include a second system information value identifier. The identifier information may be sent after a direct link between the first terminal device and the second terminal device is established, or may be included in a direct link accept message sent by the first terminal device to the second terminal device. This is not limited in this embodiment of this application. The second terminal device determines, based on the received second cell identifier and the received second system information value identifier, whether system information needs to be requested from the second terminal device. If a first cell identifier is inconsistent with the second cell identifier, or if a first cell identifier is consistent with the second cell identifier but a first system information value identifier is different from the second system information value identifier, the second terminal device sends a request message to the first terminal device, where the request message requests the first terminal device to send the system information to the second terminal device. The second terminal device may send the request message and the second message by using one piece of information, or may separately send the request message and the second message. This is not limited in this embodiment of this application. If the first terminal device receives the request message sent by the second terminal device, the first terminal device sends a first message to the second terminal device. If the first terminal device receives a second message sent by the second terminal device, the first terminal device may further store specific system information of each second terminal device. A specific implementation process is shown in FIG. 10.

According to the system information transmission method provided in this embodiment of this application, the first terminal device sends the system information to the second terminal device when determining that the first terminal device needs to send the system information to the second terminal device, so that power consumption and signaling overheads can be reduced in comparison with a case in which the first terminal device periodically sends all system information received from a base station to the second terminal device.

The foregoing mainly describes the solutions provided in the embodiments of this application from the perspective of interaction between the first terminal device and the second terminal device. It may be understood that to implement the foregoing functions, the first terminal device and the second terminal device include corresponding hardware structures and/or software units for performing the functions. With reference to the units and the algorithm steps in the examples described in the embodiments disclosed in this application, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units of the first terminal device and the second terminal device may be obtained through division based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that in the embodiments of this application, unit division is an example and is merely logical function division. In actual implementation, another division manner may be used.

Based on a same concept as the foregoing method embodiment, an embodiment of this application provides a system information transmission apparatus.

Figure 11:
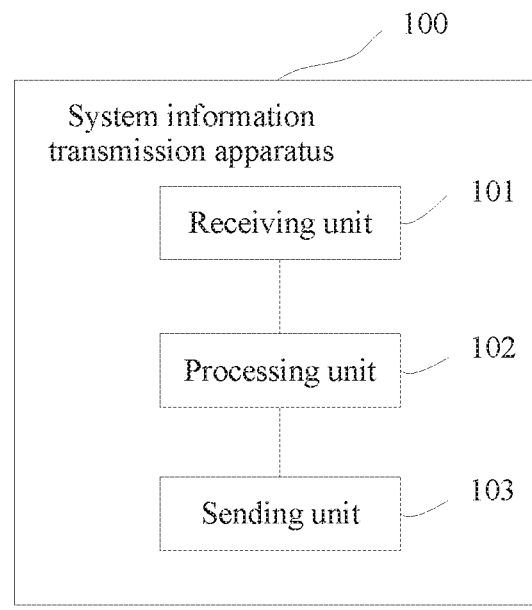
FIG. 11 is a schematic structural diagram of a system information transmission apparatus according to an embodiment of this application.

When an integrated unit is used, FIG. 11 is a schematic diagram of a possible logical structure of a system information transmission apparatus. The system information transmission apparatus may be applied to a first terminal device. Referring to FIG. 11, a system information transmission apparatus 100 includes a receiving unit 101, a processing unit 102, and a sending unit 103. The receiving unit 101 is configured to obtain identifier information sent by a second terminal device, where the identifier information includes a first cell identifier, and the first cell identifier is a cell identifier of a camped-on cell or a serving cell that is accessed before a direct link between the second terminal device and the first terminal device is established. The processing unit 102 is configured to determine whether the first cell identifier is consistent with a second cell identifier, where the second cell identifier is a cell identifier of a camped-on cell or a serving cell that is accessed after the direct link between the second terminal device and the first terminal device is established or is a cell identifier of a camped-on cell or a serving cell of the first terminal device. The sending unit 103 is configured to: if the processing unit determines that the first cell identifier is inconsistent with the second cell identifier, send a first message to the second terminal device, where the first message is a part or all of system information of the camped-on cell or the serving cell of the first terminal device.

In a possible implementation, the identifier information further includes a first system information value identifier, and the first system information value identifier is a system information value identifier of the camped-on cell or the serving cell that is accessed before the direct link between the second terminal device and the first terminal device is established.

The processing unit 102 is further configured to determine whether the first system information value identifier is the same as a second system information value identifier, where the second system information value identifier is a system information value identifier of the camped-on cell or the serving cell of the first terminal device.

The sending unit 103 is configured to: if the processing unit 102 determines that the first cell identifier is consistent with the second cell identifier but the first system information value identifier is different from the second system information value identifier, send the first message to the second terminal device.

In another possible implementation, the first message includes basic system information required by the second terminal device.

In still another possible implementation, the first message further includes specific system information required by the second terminal device.

The receiving unit 101 is further configured to: before the sending unit 103 sends the first message to the second terminal device, receive a second message sent by the second terminal device, where the second message is used to indicate the specific system information required by the second terminal device.

In still another possible implementation, the sending unit 103 is further configured to: if the processing unit 102 determines that the first cell identifier is consistent with the second cell identifier and that the first system information value identifier is the same as the second system information value identifier, send indication information to the second terminal device, where the indication information is used to indicate that original system information stored by the second terminal device is valid, and the original system information is system information delivered by a network device of the camped-on cell or the serving cell that is accessed before the direct link between the second terminal device and the first terminal device is established.

In still another possible implementation, the processing unit 102 is further configured to: before the receiving unit 101 obtains the identifier information sent by the second terminal device, determine that the direct link between the first terminal device and the second terminal device is established.

When a hardware form is used for implementation, in this embodiment of this application, the receiving unit 101 may be a communications interface, a receiver, a transceiver circuit, or the like. The processing unit 102 may be a processor or a controller, and the sending unit 103 may be a communications interface, a transmitter, a transceiver circuit, or the like. The communications interface is a generic term, and may include one or more interfaces.

Figure 12:
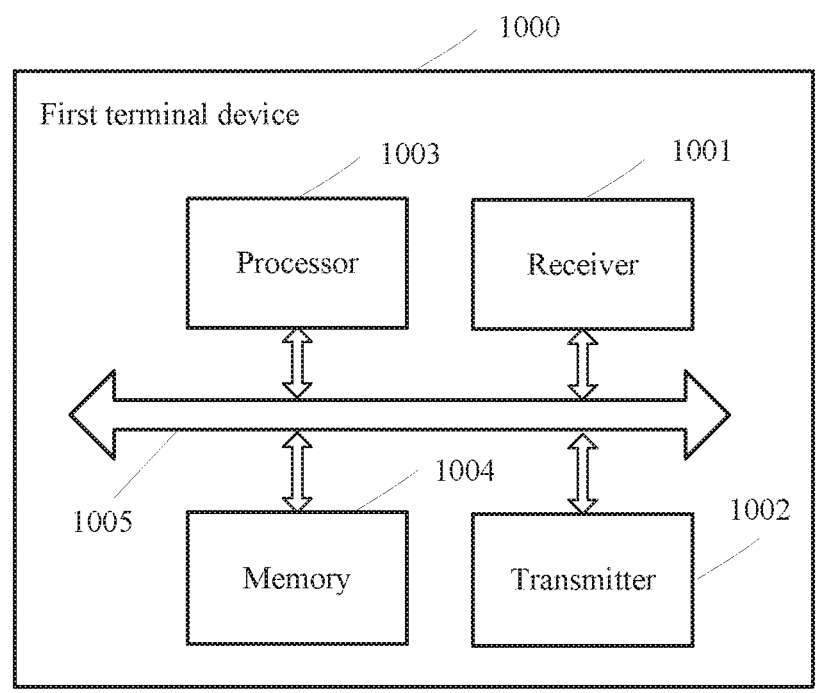
FIG. 12 is a schematic structural diagram of a first terminal device according to an embodiment of this application.

When the receiving unit 101 is the receiver, the processing unit 102 is the processor, and the sending unit 103 is the transmitter, the system information transmission apparatus 100 in this embodiment of this application may be a terminal device shown in FIG. 12. The terminal device shown in FIG. 12 may be a first terminal device.

FIG. 12 is a schematic diagram of a first terminal device 1000 according to an embodiment of this application. The first terminal device 1000 may be configured to perform the method performed by the first terminal device in FIG. 2 to FIG. 10. As shown in FIG. 12, the first terminal device 1000 includes a receiver 1001, a transmitter 1002, a processor 1003, and a memory 1004. The receiver 1001, the transmitter 1002, the processor 1003, and the memory 1004 may be connected to each other through a bus system 1005.

The memory 1004 is configured to store a program, an instruction, or code. The processor 1003 is configured to execute the program in the memory 1004, to control the receiver 1001 to obtain identifier information sent by a second terminal device, control the transmitter 1002 to send a first message to the second terminal device, and implement the steps and the functions implemented by the first terminal device in the foregoing implementations. Details are not described herein again. For specific implementations of the receiver 1001, the transmitter 1002, and the processor 1003, refer to specific descriptions of the receiving unit 101, the processing unit 102, and the sending unit 103 in the foregoing implementations in FIG. 11. Details are not described herein again.

Based on a same concept as the foregoing method embodiment, an embodiment of this application further provides another system information transmission apparatus.

Figure 13:
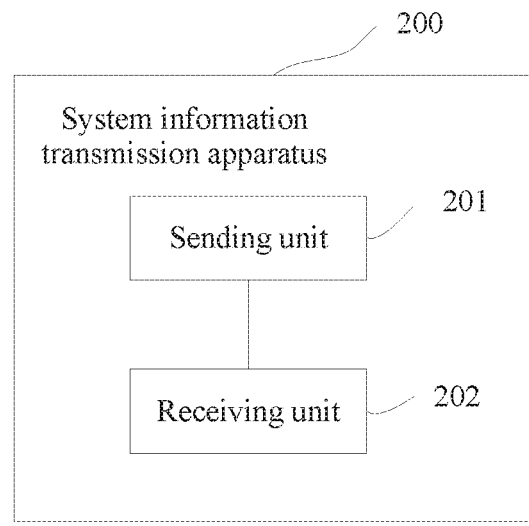
FIG. 13 is a schematic structural diagram of another system information transmission apparatus according to an embodiment of this application.

When an integrated unit is used, FIG. 13 is another schematic diagram of a possible logical structure according to an embodiment of this application. The system information transmission apparatus may be applied to a second terminal device. Referring to FIG. 13, a system information transmission apparatus 200 includes a sending unit 201 and a receiving unit 202. The sending unit 201 is configured to send the identifier information to a first terminal device, where the identifier information includes a first cell identifier, and the first cell identifier is a cell identifier of a camped-on cell or a serving cell that is accessed before a direct link between the second terminal device and the first terminal device is established. The receiving unit 202 is configured to receive a first message sent by the first terminal device, where the first message is a part or all of system information of a camped-on cell or a serving cell of the first terminal device, the first message is sent by the first terminal device if the first terminal device determines that the first cell identifier is inconsistent with a second cell identifier, and the second cell identifier is a cell identifier of a camped-on cell or a serving cell that is accessed after the direct link between the second terminal device and the first terminal device is established or is a cell identifier of the camped-on cell or the serving cell of the first terminal device.

In a possible implementation, the identifier information further includes a first system information value identifier, and the first system information value identifier is a system information value identifier of the camped-on cell or the serving cell that is accessed before the direct link between the second terminal device and the first terminal device is established. The first message is sent by the first terminal device if the first terminal device determines that the first cell identifier is consistent with the second cell identifier but the first system information value identifier is different from a second system information value identifier, and the second system information value identifier is a system information value identifier of the camped-on cell or the serving cell of the first terminal device.

In another possible implementation, the first message includes basic system information required by the second terminal device.

In still another possible implementation, the first message further includes specific system information required by the second terminal device.

The sending unit 201 is further configured to send a second message to the first terminal device before the receiving unit receives the first message sent by the first terminal device, where the second message is used to indicate the specific system information required by the second terminal device.

In still another possible implementation, the receiving unit 202 is further configured to: after the sending unit 201 sends the identifier information to the first terminal device, receive indication information sent by the first terminal device, where the indication information is used to indicate that original system information stored by the second terminal device is valid, the indication information is sent by the first terminal device if the first terminal device determines that the first cell identifier is consistent with the second cell identifier and that the first system information value identifier is the same as the second system information value identifier, and the original system information is system information delivered by a network device of the camped-on cell or the serving cell that is accessed before the direct link between the second terminal device and the first terminal device is established.

In still another possible implementation, the sending unit 201 is further configured to: before sending the identifier information to the first terminal device, determine that the direct link between the second terminal device and the first terminal device is established.

When a hardware form is used for implementation, in this embodiment of this application, the sending unit 201 may be a communications interface, a transmitter, a transceiver circuit, or the like. The receiving unit 202 may be a communications interface, a receiver, a transceiver circuit, or the like. The communications interface is a generic term, and may include one or more interfaces.

Figure 14:
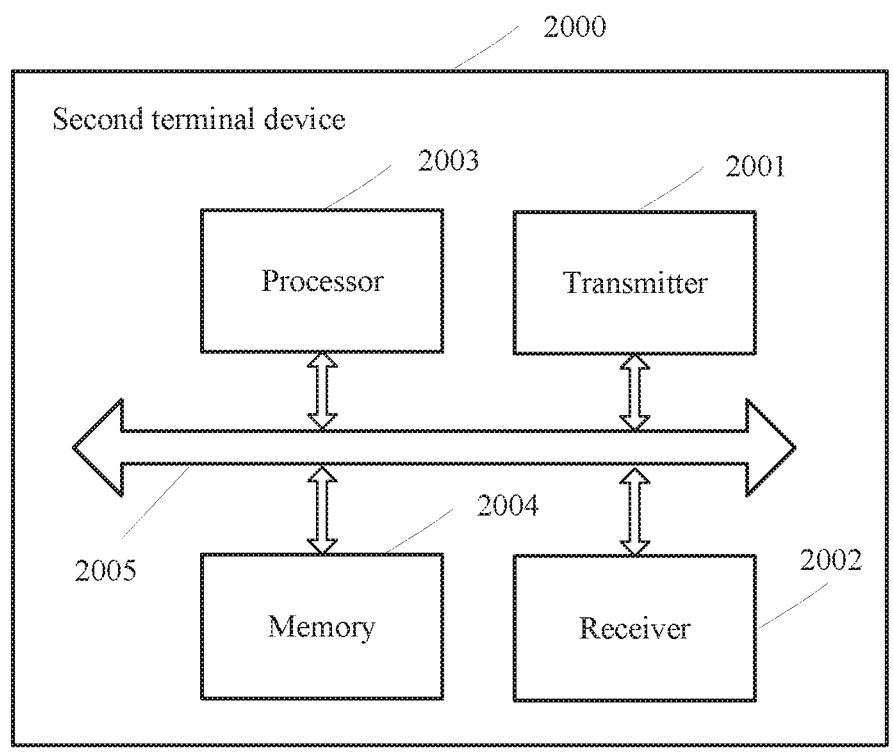
FIG. 14 is a schematic structural diagram of a second terminal device according to an embodiment of this application.

When the sending unit 201 is the transmitter and the receiving unit 202 is the receiver, the system information transmission apparatus 200 in this embodiment of this application may be a terminal device shown in FIG. 14. The terminal device shown in FIG. 14 may be a second terminal device.

FIG. 14 is a schematic diagram of a second terminal device 2000 according to an embodiment of this application. The second terminal device 2000 may be configured to perform the method performed by the second terminal device in FIG. 2 to FIG. 10. As shown in FIG. 14, the second terminal device 2000 includes a transmitter 2001, a receiver 2002, a processor 2003, and a memory 2004. The transmitter 2001, the receiver 2002, the processor 2003, and the memory 2004 may be connected to each other through a bus system 2005.

The memory 2004 is configured to store a program, an instruction, or code. The processor 2003 is configured to execute the program in the memory 2004, to control the transmitter 2001 to send the identifier information to a first terminal device, control the receiver 2002 to receive a first message sent by the first terminal device, and implement the steps and the functions implemented by the second terminal device in the foregoing implementations. Details are not described herein again. For specific implementations of the transmitter 2001, the receiver 2002, and the processor 2003, refer to specific descriptions of the sending unit 201 and the receiving unit 202 in the foregoing implementations in FIG. 13. Details are not described herein again.

It may be understood that FIG. 12 and FIG. 14 show merely simplified designs of the first terminal device and the second terminal device. In actual application, the first terminal device and the second terminal device are not limited to the foregoing structures. In actual application, the first terminal device and the second terminal device each may include any quantity of interfaces, processors, memories, and the like, and all terminals that can implement the embodiments of this application shall fall within the protection scope of the embodiments of this application.

It may be further understood that the system information transmission apparatus 100 and the first terminal device 1000, and the system information transmission apparatus 200 and the second terminal device 2000 in the embodiments of this application may be configured to implement the corresponding functions of the first terminal device and the second terminal device in the method embodiments in the embodiments of this application. Therefore, for a part that is not described in detail in the embodiments of this application, refer to related descriptions in the method embodiments. Details are not described in the embodiments of this application again.

It may be further understood that in the embodiment of this application, the processor may be a central processing unit (Central Processing Unit, CPU), or may be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor, or the processor may be any conventional processor or the like.

The memory may include a read-only memory and a random access memory, and provide an instruction and data for the processor. A part of the memory may further include a non-volatile random access memory. For example, the memory may further store device type information.

The bus system may include a power bus, a control bus, a status signal bus, and the like in addition to a data bus. However, for clear description, various types of buses in the figure are marked as the bus system.

In an implementation process, the steps in the foregoing method embodiments may be completed by using a hardware integrated logic circuit in the processor or by using an instruction in a form of software. The steps of the packet processing method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method embodiments in combination with hardware in the processor. To avoid repetition, details are not described herein again.

This application further provides a communications system, and the communications system includes a first terminal device and a second terminal device. The first terminal device may be the first terminal device provided in the foregoing embodiment, and the second terminal device may be the second terminal device provided in the foregoing embodiment.

An embodiment of this application provides a computer readable storage medium or a computer program product, configured to store a computer program. The computer program is used to perform the system information transmission method in the foregoing method embodiment.

According to the system information transmission method and apparatus provided in the embodiments of this application, the first terminal device obtains the identifier information sent by the second terminal device, and if the first terminal device determines that the first cell identifier included in the obtained identifier information is inconsistent with the second cell identifier, the first terminal device sends the first message to the second terminal device. In the foregoing method, whether the second terminal device is out of coverage of the camped-on cell or the serving cell that is accessed after the direct link between the second terminal device and the first terminal device is established or is in coverage of the camped-on cell or the serving cell that is accessed after the direct link between the second terminal device and the first terminal device is established, the second terminal device can obtain system information delivered by the network device of the camped-on cell or the serving cell that is accessed after the direct link between the second terminal device and the first terminal device is established. In the foregoing method, the second terminal device can obtain the system information delivered by the network device of the camped-on cell or the serving cell that is accessed after the direct link between the second terminal device and the first terminal device is established, without a need to interact with the network device of the camped-on cell or the serving cell that is accessed after the direct link between the second terminal device and the first terminal device is established. Therefore, the second terminal device no longer needs to maintain a communication link between the second terminal device and the network device of the camped-on cell or the serving cell that is accessed after the direct link between the second terminal device and the first terminal device is established, thereby reducing complexity and power consumption.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk memory, a CD-ROM, an optical memory, and the like) that include computer-usable program code.

The embodiments of this application are described with reference to the flowcharts and/or the block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A system information transmission method implemented by a first terminal device, the method comprising:
  obtaining identifier information from a second terminal device, wherein the identifier information comprises a first cell identifier, and wherein the first cell identifier identifies either a first camped-on cell or a first serving cell that is accessed before a direct link between the second terminal device and the first terminal device is established; and sending a first message to the second terminal device when the first cell identifier is inconsistent with a second cell identifier, wherein the second cell identifier identifies one of a second camped-on cell, a second serving cell that is accessed after the direct link between the second terminal device and the first terminal device is established, a third camped-on cell, or a third serving cell of the first terminal device, and wherein the first message is at least a part of system information from a first network device of the third camped-on cell or the third serving cell.

2. The system information transmission method of claim 1, wherein the identifier information further comprises a first system information value identifier, wherein the first system information value identifier identifies either the first camped-on cell or the first serving cell, wherein the method further comprises sending the first message to the second terminal device when the first cell identifier is consistent with the second cell identifier and the first system information value identifier is different from a second system information value identifier, and wherein the second system information value identifier is a system information value identifier of either the third camped-on cell or the third serving cell.

3. The system information transmission method of claim 1, wherein the first message comprises basic system information required by the second terminal device.

4. The system information transmission method of claim 1, wherein the first message further comprises specific system information required by the second terminal device, wherein before sending the first message to the second terminal device, the method further comprises receiving a second message from the second terminal device, and wherein the second message indicates the specific system information.

5. The system information transmission method of claim 4, wherein after receiving the second message from the second terminal device, the method further comprises storing the specific system information.

6. The system information transmission method of claim 2, wherein after obtaining the identifier information from the second terminal device, the method further comprises sending, by the first terminal device, indication information to the second terminal device when the first terminal device determines that the first cell identifier is consistent with the second cell identifier and that the first system information value identifier is the same as the second system information value identifier, wherein the indication information indicates that original system information in the second terminal device is valid, and wherein the original system information is from a second network device of the first camped-on cell or the first serving cell.

7. The system information transmission method of claim 1, wherein before obtaining the identifier information from the second terminal device, the method further comprises determining that the direct link between the first terminal device and the second terminal device is established.

8. The system information transmission method of claim 1, wherein obtaining the identifier information comprises receiving, from the second terminal device, a direct link request message comprising the identifier information.

9. The system information transmission method of claim 6, further comprising sending the second terminal device a direct link accept message that comprises the indication information.

10. A system information transmission method implemented by a second terminal device, the method comprising:

sending identifier information to a first terminal device, wherein the identifier information comprises a first cell identifier that identifies a first camped-on cell or a first serving cell that is accessed before a direct link between the second terminal device and the first terminal device is established; and receiving a first message from the first terminal device when the first cell identifier is inconsistent with a second cell identifier, wherein the first message is at least a part of system information from a first network device of a third camped-on cell or a third serving cell of the first terminal device, and wherein the second cell identifier identifies one of a second camped-on cell, a second serving cell that is accessed after the direct link between the second terminal device and the first terminal device is established, the third camped-on cell, or the third serving cell.

11. The system information transmission method of claim 10, wherein the identifier information further comprises a first system information value identifier, wherein the first system information value identifier is a system information value identifier of either the first camped-on cell or the first serving cell, wherein the first message is from the first terminal device when the first cell identifier is consistent with the second cell identifier and the first system information value identifier is different from a second system information value identifier, and wherein the second system information value identifier is a system information value identifier of the third camped-on cell or the third serving cell.

12. The system information transmission method of claim 10, wherein the first message comprises basic system information.

13. The system information transmission method of claim 10, wherein the first message further comprises specific system information required by the second terminal device, wherein before the receiving the first message from the first terminal device, the method further comprises sending a second message to the first terminal device, and wherein the second message indicates the specific system information.

14. The system information transmission method of claim 13, wherein after sending the identifier information to the first terminal device, the method further comprises receiving indication information from the first terminal device when the first cell identifier is consistent with the second cell identifier and a first system information value identifier is the same as a second system information value identifier, wherein the indication information indicates that original system information in the second terminal device is valid, and wherein the second network device is a network device of the first camped-on cell or the first serving cell.

15. The system information transmission method of claim 10, wherein before sending the identifier information to the first terminal device, the method further comprises determining that the direct link between the second terminal device and the first terminal device is established.

16. The system information transmission method of claim 10, wherein sending the identifier information to the first terminal device comprises sending the first terminal device a direct link request message that carries the identifier information.

17. The system information transmission method of claim 14, further comprising receiving, from the first terminal device, a direct link accept message that comprises the indication information.

18. A computer program product comprising computer-executable instructions stored on a non-transitory computer-readable medium that, when executed by a processor, cause a first terminal device to:
- obtain identifier information from a second terminal device, wherein the identifier information comprises a first cell identifier that identifies a first camped-on cell or a first serving cell that is accessed before a direct link between the second terminal device and the first terminal device is established; and
- send a first message to the second terminal device when the first cell identifier is inconsistent with a second cell identifier, wherein the second cell identifier identifies one of a second camped-on cell, a second serving cell that is accessed after the direct link between the second terminal device and the first terminal device is established, a third camped-on cell, or a third serving cell of the first terminal device, and wherein the first message is at least a part of system information from a first network device of either the third camped-on cell or the third serving cell.

19. The computer program product of claim 18, wherein the identifier information further comprises a first system information value identifier that identifies the first camped-on cell or the first serving cell, wherein the computer-executable instructions further cause the first terminal device to send the first message to the second terminal device when the first cell identifier is consistent with the second cell identifier and the first system information value identifier is different from a second system information value identifier, and wherein the second system information value identifier is a system information value identifier of the third camped-on cell or the third serving cell.

20. The computer program product of claim 18, wherein the first message comprises basic system information.

* * * * *

UNITED STATES PATENT AND TRADEMARK OFFICE
CERTIFICATE OF CORRECTION

PATENT NO. : 10,798,641 B2
APPLICATION NO. : 16/497245
DATED : October 6, 2020
INVENTOR(S) : Yiru Kuang et al.

It is certified that error appears in the above-identified patent and that said Letters Patent is hereby corrected as shown below:

In the Claims

Claim 12, Column 24, Line 33 and 34: "basic system information." should read "basic system information required by the second terminal device."

Signed and Sealed this
Seventeenth Day of November, 2020

Andrei Iancu
*Director of the United States Patent and Trademark Office*